UNITED STATES PATENT OFFICE 2,429,469

THIOKETONES CONTAINING A CYCLOALKYL GROUP

Grafton H. Keyes, Rochester, N. Y., assignor to Eastman Kodak Company, Rochester, N. Y., a corporation of New Jersey No Drawing. Application June 1, 1945, Serial No. 597,149

11 Claims. (Cl. 260—298)

This invention relates to thioketones containing a cycloalkyl group and to a process for preparing the same. This application is a continuation-in-part of my copending application Serial No. 478,007, filed March 4, 1943, and a continuation-in-part of the copending application of Leslie G. S. Brooker and Grafton H. Keyes Serial No. 515,978, filed December 28, 1943.

The thioketones of my invention can be represented by the following general formula:

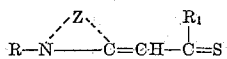

wherein R represents an alkyl or aryl group, $R_1$ represents a cycloalkyl group containing from 3 to 6 carbon atoms in the ring and Z represents the non-metallic atoms necessary to complete a heterocyclic nucleus selected from those consisting of those of the benzothiazole series, those of the benzoselenazole series, those of the α-naphthothiazole series, those of the β-naphthothiazole series, those of the α-naphthoselenazole series and those of the β-naphthoselenazole series.

The thioketones of my invention, especially those wherein R represents an alkyl group containing from 1 to 4 carbon atoms, can be condensed with alkyl salts to give alkylmercapto compounds of the following general formula:

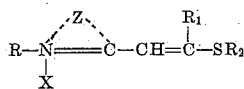

wherein R, $R_1$ and Z have the values given above and $R_2$ represents an alkyl group and X represents an anion. The alkylmercapto compounds can be condensed, as shown in the aforesaid Brooker and Keyes application Serial No. 515,978, with cyclammonium quaternary salts containing a reactive methyl group to give mesocycloalkyl carbocyanine dyes, or with heterocyclic compounds containing an intracyclicketomethylene group to give merocarbocyanine dyes containing a cycloalkyl group on the dimethine chain.

In accordance with my invention, I prepare the thioketones by condensing a cyclammonium quaternary salt containing a β-cycloalkyl-β-halogenovinyl group of the following general formula:

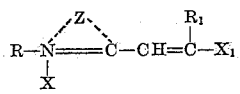

wherein R, $R_1$, X and Z have the values set forth above and $X_1$ represents a halogen atom, with a thioamide, e. g. thioacetamide, thiobenzamide and thioacetanilide. The condensation with the thioamide is advantageously carried out in the presence of a diluent, such as a lower aliphatic alcohol, e. g. methyl, ethyl or isopropyl alcohol. Heat accelerates the condensation.

The β-cycloalkyl-β-halogenovinyl compounds can be prepared by condensing a ketone derivative of a heterocyclic nitrogen base of the following general formula:

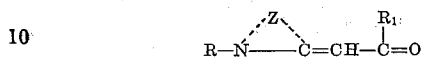

wherein R, $R_1$ and Z have the values given above with a phosphorus oxychloride. The condensation is advantageously but not necessarily effected in the presence of a diluent. The reaction takes place very readily, so that, in some cases, it is advantageous to chill the reaction mixture. Benzene, toluene, chloroform or carbontetrachloride are suitable diluents with which to effect the condensation. Phosphorus oxychloride ($POCl_3$) is advantageously employed.

The ketone derivatives of the heterocyclic nitrogen bases can be prepared by condensing a cyclammonium quaternary salt of the following general formula:

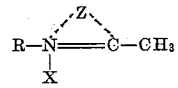

wherein R, X and Z have the values set forth above with a cycloalkane carboxylic acid chloride, in the presence of an acid-binding agent. Ordinarily, to effect the condensation, the quaternary salt is advantageously suspended in cold, dry pyridine, the suspension cooled to —10 to +10° C. and the cycloalkane carboxylic halide added gradually to the chilled suspension with agitation. Other tertiary amines, e. g. trialkylamines or dialkylanilines can be employed as the acid-binding agent.

The following examples will serve to illustrate my new thioketones and the manner of obtaining the same.

*Example 1.—2-cyclopropylthioformylmethylene-3-ethylbenzothiazoline*

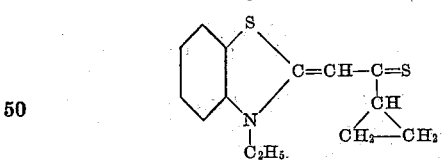

15.3 g. (1 mol.) of 2-cyclopropylformylmethylene-3-ethylbenzothiazoline was dissolved in 50 cc. of dry benzene. 14.2 g. (1.5 mol.) of phosphorus oxychloride was added and the mixture well stirred. After a few minutes the 2-(β-chloro-β-cyclopropylvinyl) benzothiazole ethochloride which had formed was precipitated on addition of 100 cc. of ether. This was collected on a filter and added to a solution of 4.7 g. (1 mol.) of thioacetamide in 25 cc. of ethyl alcohol. The mixture was heated under reflux for 5 minutes. The thioketone separated on chilling and was collected on filter, washed with water and dried. It was purified by two successive recrystallizations from methyl alcohol and obtained as yellow crystals. Melting point 123°–125° C.

The 2-cyclopropylformylmethylene - 3 - ethylbenzothiazoline employed above was prepared as follows:

30 g. (1 mol.) of 2-methylbenzothiazole etho-p-toluene-sulfonate was suspended in 50 cc. of pyridine and the mixture chilled by means of a freezing mixture of ice and acetone. 9.1 g. (1 mol.) of cyclopropane carboxylic acid chloride was added slowly with good stirring. This mixture was allowed to stand in the cold for about 15 minutes. It was then removed from the freezing mixture and allowed to come slowly to room temperature and finally was heated to the temperature of a steam bath. The ketone separated as a sticky mass when the pyridine solution was poured into 500 cc. of cold water. After collecting on a filter, it was purified by recrystallizing from ligroin.

In a similar manner, 2-cyclopropylthioformyl-methylene - 3 - methylbenzothiazoline was prepared as yellow-orange needles melting at 171°–172° C. dec. Similarly 5-chloro-2-cyclopropyl-thioformylmethylene-3-ethylbenzothiazoline was prepared as opaque yellow crystals melting at 189° to 191° C.

*Example 2.—2-cyclopropylthioformylmethylene-1-ethyl-β-napththothiazoline*

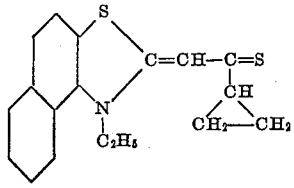

10.4 g. (1 mol.) of 2-cyclopropylformylmethylene-1-ethyl-β-naphthothiazoline was suspended in 35 cc. of dry benzene. 8.1 g. (1.5 mol.) of phosphorus oxychloride was added and the mixture stirred at room temperature for about 10 minutes. The 2-(β-chloro-β-cyclopropylvinyl)-β-naphthothiazole ethochloride formed by the above reaction separated on chilling and was collected on a filter and washed with ether. It was added to a solution of 2.6 g. (1 mol.) thioacetamide in 35 cc. of absolute ethyl alcohol and the mixture refluxed for 5 minutes. Thioketone separated on chilling and was collected on filter, washed with water and dried. It was purified by repeated recrystallization from methyl alcohol and obtained as amber flakes. Melting point 179°–181° C. dec.

The 2-cyclopropylformylmethylene-1-ethyl-β-naphthothiazoline employed above was prepared as follows:

39.9 g. (1 mol.) of 2-methyl-β-naphthothiazole etho-p-toluenesulfonate was dissolved in 50 cc. of pyridine and chilled in freezing mixture of ice-acetone. 10.4 g. (1 mol.) cyclopropane carboxylic acid chloride was added slowly with good stirring. The mixture was allowed to stand 5 minutes in the cold, then allowed to come to room temperature and finally heated to the temperature of a steam bath. The ketone separated as a sticky mass when poured into a large volume of cold water. It was purified by recrystallization from ligroin.

In a similar manner 2-cyclopropylthioformyl-methylene-1-methyl - β - naphthothiazoline was prepared as yellow crystals melting at 175° to 177° C. dec.

*Example 3.—2-cyclopropylthioformylmethylene-3-ethylbenzoselenazoline*

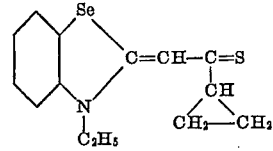

17 g. of 2 - cyclopropylformylmethylene - 3 - ethylbenzoselenazoline was suspended in 100 cc. of dry benzene. 13.4 g. (1.5 mol.) of phosphorus oxychloride was added with stirring. After about 10 minutes the chloro intermediate separated and was collected on filter and washed with ether. It was then added to a solution of 4.4 g. (1 mol.) thioacetamide dissolved in 50 cc. of absolute ethyl alcohol and the mixture refluxed for 5 minutes. The thioketone separated on chilling. It was collected on filter, washed with water and recrystallized from methyl alcohol. It was obtained as yellow crystals. Melting point 111°–113° C.

The 2-cyclopropylformylmethylene-3-ethylbenzoselenazoline employed was prepared as follows:

34.2 g. (1 mol.) of 2-methylbenzoselenazole ethiodide was suspended in 75 cc. of pyridine and the mixture chilled in a freezing mixture of ice-acetone. 10.4 g. (1 mol.) cyclopropane-carboxylic acid chloride was added slowly with good stirring. The mixture was stirred in the cold for a 15-minute period. It was removed from the freezing mixture and heated gradually to temperature of the steam bath. On pouring into a large volume of cold water, the ketone separated. It was collected on filter and washed with water. It was further purified by recrystallization from ligroin.

*Example 4.—5 - chloro-2-cyclopropylthioformyl-methylene-3-ethylbenzothiazoline*

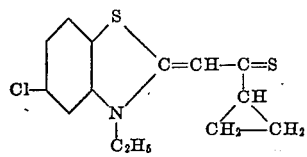

16.7 g. (1 mol.) of 5-chloro-2-cyclopropyl-formylmethylene-3-ethylbenzothiazoline was dissolved in 50 cc. of dry benzene. 13.8 g. (1 mol.) of phosphorus oxychloride was added with stirring. After about 10 minutes the 2-(β-chloro-β-cyclopropylvinyl)-5-chlorobenzothiazole ethochloride which had formed separated and was collected on filter and washed with ether. This was added to a solution of 4.5 g. (1 mol.) of thioacetamide in 30 cc. of absolute ethyl alcohol and the mixture refluxed for 5 minutes. Thioketone separated on chilling and was collected on filter, washed with water and dried. It was purified by repeated recrystallizations from methyl alcohol and obtained as opaque yellow crystals. Melting point 189°–191° C. dec.

The 5 - chloro-2-cyclopropylformylmethylene- 3-ethylbenzothiazoline employed above was prepared as follows:

38.3 g. (1 mol.) of 5-chloro-2-methylbenzothiazole etho-p-toluene sulfonate was suspended in 50 cc. of pyridine and chilled in a freezing mixture of ice-water. 10.4 g. (1 mol) of cyclopropane carboxylic acid chloride was added slowly with good stirring. The mixture was allowed to stand 15 minutes in the cold, then allowed to come to room temperature and finally heated a few minutes on a steam bath. Ketone separated on pouring into a large volume of cold water. It was collected on a filter, washed with water and dried. It was further purified by recrystallization from ligroin.

In a similar manner, 5-chloro-2-cyclobutyl-thioformylmethylene-3-ethylbenzothiazoline was prepared as yellow crystals melting at 150°–152° C.

*Example 5.—2-cyclohexylthioformylmethylene-3-ethylbenzothiazoline*

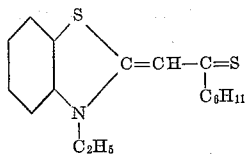

45 g. (1 mol.) of 2-cyclohexylformylmethylene-3-ethylbenzothiazoline was suspended in 100 cc. of dry benzene. 36 g. (1.5 mol.) of phosphorus oxychloride was added and the mixture well stirred. After a few minutes the 2-($\beta$-chloro-$\beta$-cyclohexylvinyl) benzothiazole ethochloride which had formed was precipitated on addition of 200 cc. of ether. This product was collected on a filter and washed with acetone. It was then added to a solution of 11.7 g. (1 mol.) of thioacetamide in 100 cc. of ethyl alcohol. This mixture was heated under reflux for five minutes. The thioketone separated on chilling and was collected on filter, washed with water and purified by recrystallization from methyl alcohol. Melting point 146°–148° C.

The 2-cyclohexylformylmethylene-3-ethylbenzothiazoline used above was prepared as follows:

69.8 g. (1 mol.) of 2-methylbenzothiazole etho-p-toluene-sulfonate was suspended in 200 cc. of pyridine and the mixture chilled by means of a freezing mixture of ice and acetone. 36.4 g. (1.25 mol.) of hexahydrobenzoyl chloride was added slowly with good mechanical stirring. This mixture was allowed to stand in the cold for a 15-minute period. It was then removed from the freezing mixture and stood at room temperature for 15 minutes; then, after heating to temperature of a steam bath, as much as possible of the pyridine was removed by distillation under reduced pressure. The residue was poured out into ice and water. The product separated as a crystalline solid and was collected on a filter and washed with water. After recrystallization from methyl alcohol, it was pure enough for use.

In a similar manner 5-chloro-2-cyclohexylthioformylmethylene-3-ethylbenzothiazoline was prepared as orange crystals melting at 151°–153° C. Also in a similar manner, 2-cyclohexylthioformylmethylene-1-ethyl-$\beta$-naphthothiazoline was prepared as yellow crystals melting at 191°–193° C. Likewise, in a similar manner, 2-cyclohexylthioformylmethylene-3-ethylbenzoselenazoline was prepared as orange-yellow crystals melting at 147°–149° C.

Alternatively, I have found that the thioketones of my invention can be prepared by condensing a cyclammonium quaternary salt of the following general formula:

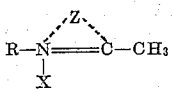

wherein R, X and Z have the values set forth above with an ester of a dithiocycloalkane carboxylic acid. Advantageously the condensation is effected in the presence of a basic condensing agent, i. e. an acid-binding agent. As basic condensing agents, organic tertiary amines are advantageously employed, e. g. trialkylamines, piperidine, or N-methylpiperidine.

The following example will serve to illustrate this alternative process for obtaining my new thioketones:

*Example 6.—2-cyclohexylthioformylmethylene-3-ethylbenzothiazoline*

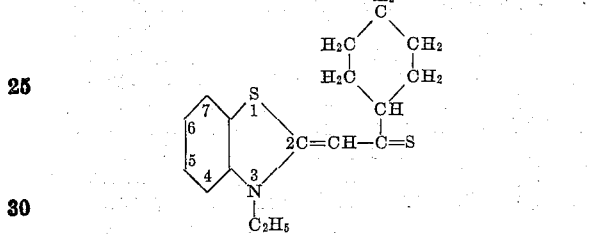

14 g. (1 mol.) of 2-methylbenzothiazole etho-p-toluenesulfonate, 7 g. (1 mol.) of methyl ester of dithiocyclohexane carboxylic acid, 40 cc. of absolute ethyl alcohol and 4 g. (1 mol.) of triethylamine were heated, under reflux, for 30 minutes. The thioketone was precipitated from the reaction mixture by the addition of 2 liters of cold water. The crude thioketone was extracted several times with hot ligroin. The thioketone which separated from the combined ligroin extracts upon chilling, were recrystallized twice from ligroin and then once from methyl alcohols. The thioketone was obtained as orange crystals, melting at 146° to 148° C.

In a manner similar to that illustrated in the foregoing examples, the other thioketones within the purview of my invention can be prepared. Thus 2-cyclopropylthioformylmethylene-3-n-butylbenzothiazoline can be prepared from 2-($\beta$-chloro-$\beta$-cyclopropylvinyl)-benzothiazole n-butochloride and thioacetamide; 2-cyclobutylthioformylmethylene-3-ethylbenzothiazoline can be prepared from 2-($\beta$-chloro-$\beta$-cyclobutylvinyl)-benzothiazole ethochloride and thioacetamide; 2-cyclopentylthioformylmethylene-3-methylbenzothiazoline can be prepared from 2-($\beta$-chloro-$\beta$-cyclopentylvinyl)-benzothiazole methochloride; 2-cyclopropylthioformylmethylene-1-ethyl-$\beta$-naphthoselenazoline can be prepared from 2-($\beta$-chloro-$\beta$-cyclopropylvinyl)-$\beta$-naphthoselenazole ethochloride; 2-cyclopropylthioformylmethylene-3-phenylbenzothiazoline can be prepared from 2-($\beta$-chloro-$\beta$-cyclopropylvinyl)-benzothiazole phenochloride and 2-cyclopropylthioformylmethylene-3-$\beta$-ethoxyethylbenzothiazoline can be prepared from 2-($\beta$-chloro-$\beta$-cyclopropylvinyl)-benzothiazole-$\beta$-ethoxyethochloride.

Any of the thioketones of my invention can be converted to alkylmercapto compounds by heating (e. g. at 90° to 150° C.) with alkyl salts, especially alkyl salts containing from 1 to 4 carbon atoms, e. g. ethyl-p-toluenesulfonate, methyl-p-toluenesulfonate, dimethylsulfate, n-butyl chloride, n-propyl bromide, isopropyl iodide, $\beta$- ethoxyethyl bromide or β-hydroxyethyl bromide. Benzyl iodide can also be employed. The anion of these alkylmercapto compounds can be changed and less soluble alkylmercapto compounds formed, e. g. the perchlorates can be formed by treating the alkylmercapto compounds in chloride, bromide or p-toluenesulfonate form with an aqueous solution of an alkali metal perchlorate, e. g. sodium perchlorate.

2-cyclopropylthioformylmethylene-3-ethylbenzothiazoline, when heated on a steam bath with an equimolecular proportion of methyl-p-toluenesulfonate for 30 minutes, yielded solid 2-(β-cyclopropyl - β - methylmercaptovinyl) - benzothiazole metho-p-toluenesulfonate.

2-cyclopropylthioformylmethylene- 1 -ethyl -β-naphthothiazoline, when heated on a steam bath with an equimolecular proportion of methyl-p-toluenesulfonate for 30 minutes, yielded solid 2-(β-cyclopropyl-β-methylmercaptovinyl)-β-naphthothiazole metho-p-toluenesulfonate.

5-chloro-2- cyclopropylthioformylmethylene-3-ethylbenzothiazoline, when heated in an oil bath at 130° C. with an equimolecular proportion of methyl-p-toluenesulfonate for 30 minutes, yielded solid 5-chloro-2-(β-cyclopropyl-β-methylmercaptovinyl) -benzothiazole metho-p-toluenesulfonate.

2-cyclopropylthioformylmethylene-3-ethylbenzoselenazoline, when heated on a steam bath with an equimolecular proportion of methyl-p-toluenesulfonate for one hour yielded solid 2-(β-cyclopropyl- β-methylcercaptovinyl) - benzoselenazole metho-p-toluenesulfonate.

2-cyclobutylthioformylmethylene- 3 -ethylbenzothiazoline, when heated on a steam bath for 30 minutes with an equimolecular proportion of methyl-p-toluenesulfonate, yielded solid 2-(β-cyclobutyl-β -methylmercaptovinyl) - benzothiazole metho-p-toluenesulfonate.

2-cyclohexylthioformylmethylene- 3 -ethylbenzothiazoline, when heated on a steam bath for 30 minutes with an equimolecular proportion of methyl-p-toluenesulfonate, yielded solid 2-(β-cyclohexyl-β-methylmercaptovinyl) - benzothiazole metho-p-toluenesulfonate.

What I claim as my invention and desire to secure by Letters Patent of the United States is:

1. A compound selected from the group consisting of the compounds which are represented by the following general formulas:

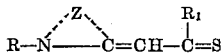

and

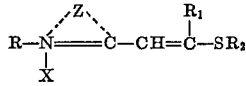

wherein R represents a member selected from the group consisting of alkyl and aryl groups, $R_1$ represents a cycloalkyl group containing from 3 to 6 carbon atoms in the ring, $R_2$ represents an alkyl group, X represents an anion, and Z represents the non-metallic atoms necessary to complete a heterocyclic nucleus selected from the group consisting of those of the benzothiazole series, those of the benzoselenazole series, those of the α-naphthothiazole series, those of the β-naphthothiazole series, those of the α-naphthoselenazole series and those of the β-naphthoselenazole series.

2. The thioketones of the following general formula:

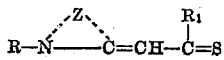

wherein R represents a member selected from the group consisting of alkyl groups and aryl groups, $R_1$ represents a cycloalkyl group containing from 3 to 6 carbon atoms in the ring and Z represents the non-metallic atoms necessary to complete a heterocyclic nucleus selected from the group consisting of those of the benzothiazole series, those of the benzoselenazole series, those of the α-naphthothiazole series, those of the β-naphthothiazole series, those of the α-naphthoselenazole series and those of the β-naphthoselenazole series.

3. The thioketones of the following general formula:

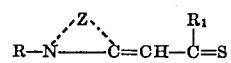

wherein R represents an alkyl group containing from 1 to 4 carbon atoms, $R_1$ represents a cycloalkyl group containing from 3 to 6 carbon atoms, and Z represents the non-metallic atoms necessary to complete a heterocyclic nucleus of the benzothiazole series.

4. The thioketone of the following formula:

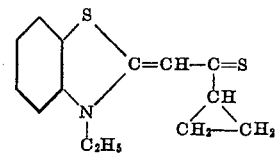

5. The thioketones of the following general formula:

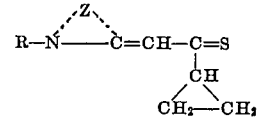

wherein R represents an alkyl group of from 1 to 4 carbon atoms and Z represents the non-metallic atoms necessary to complete a heterocyclic nucleus of the benzothiazole series.

6. The thioketones of the following general formula:

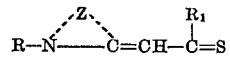

wherein R represents an alkyl group containing from 1 to 4 carbon atoms, $R_1$ represents a cycloalkyl group containing from 3 to 6 carbon atoms and Z represents the non-metallic atoms necessary to complete a heterocyclic nucleus of the benzoselenazole series.

7. The thioketones of the following general formula:

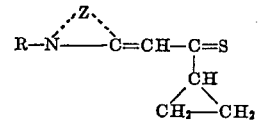

wherein R represents an alkyl group containing from 1 to 4 carbon atoms and Z represents the non-metallic atoms necessary to complete a heterocyclic nucleus of the benzoselenazole series.

8. The thioketone of the following general formula:

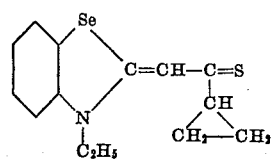

9. The thioketones of the following general formula:

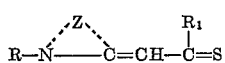

wherein R represents an alkyl group containing from 1 to 4 carbon atoms, $R_1$ represents a cycloalkyl group containing from 3 to 6 carbon atoms and Z represents the non-metallic atoms necessary to complete a heterocyclic nucleus of the β-naphthothiazole series.

10. The thioketones of the following general formula:

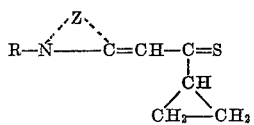

wherein R represents an alkyl group containing from 1 to 4 carbon atoms and Z represents the non-metallic atoms necessary to complete a heterocyclic nucleus of the β-naphthothiazole series.

11. The thioketone of the following formula:

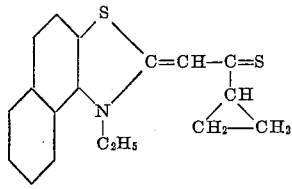

GRAFTON H. KEYES.

REFERENCES CITED

The following references are of record in the file of this patent:

UNITED STATES PATENTS

| Number | Name | Date |
|---|---|---|
| 2,106,383 | Schneider | Jan. 25, 1938 |
| 2,107,379 | Koslowsky | Feb. 8, 1938 |
| 2,356,569 | De Smet et al. | Aug. 22, 1944 |